United States Patent
Hatano

(10) Patent No.: US 10,889,304 B2
(45) Date of Patent: Jan. 12, 2021

(54) VEHICLE CONTROL DEVICE, VEHICLE CONTROL METHOD, AND VEHICLE CONTROL PROGRAM

(71) Applicant: HONDA MOTOR CO., LTD., Tokyo (JP)

(72) Inventor: Kunimichi Hatano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 299 days.

(21) Appl. No.: 16/077,771

(22) PCT Filed: Feb. 19, 2016

(86) PCT No.: PCT/JP2016/054883
§ 371 (c)(1),
(2) Date: Aug. 14, 2018

(87) PCT Pub. No.: WO2017/141426
PCT Pub. Date: Aug. 24, 2017

(65) Prior Publication Data
US 2019/0054928 A1    Feb. 21, 2019

(51) Int. Cl.
*G05D 1/00* (2006.01)
*B60W 50/14* (2020.01)
(Continued)

(52) U.S. Cl.
CPC ............ *B60W 50/14* (2013.01); *B60W 10/04* (2013.01); *B60W 10/18* (2013.01); *B60W 10/20* (2013.01);
(Continued)

(58) Field of Classification Search
CPC ...... B60W 50/14; B60W 30/14; B60W 10/20; B60W 10/18; B60W 10/04;
(Continued)

(56) References Cited

U.S. PATENT DOCUMENTS 6,385,529 B1 * 5/2002 Minowa ............. B60K 31/0008
701/96
6,622,079 B2 * 9/2003 Minowa ............. B60K 31/0058
701/96
(Continued)

FOREIGN PATENT DOCUMENTS

CN    104925057    9/2015
EP    2982565    2/2016
(Continued)

OTHER PUBLICATIONS

Japanese Office Action for Japanese Patent Application No. 2017-567915 dated Jul. 2, 2019.
(Continued)

*Primary Examiner* — Shardul D Patel
(74) *Attorney, Agent, or Firm* — Amin, Turocy & Watson, LLP

(57) ABSTRACT

A vehicle control device includes: an automatic driving control unit that executes a first driving mode in which at least one of acceleration/deceleration, and steering of a host vehicle is automatically controlled in order for the host vehicle to travel along a route up to a destination; and a specific situation transition control unit that encourages a vehicle occupant of the host vehicle to transition to a second driving mode in which the degree of automatic driving is lower in comparison to the first driving mode by decelerating the host vehicle in a case of terminating execution of the first driving mode at a scheduled termination point of the first driving mode.

8 Claims, 10 Drawing Sheets

(51) Int. Cl.
*B60W 30/14* (2006.01)
*B60W 10/04* (2006.01)
*B60W 10/18* (2012.01)
*B60W 10/20* (2006.01)

(52) U.S. Cl.
CPC ............ *B60W 30/14* (2013.01); *G05D 1/0088* (2013.01); *B60W 2530/00* (2013.01); *B60W 2710/18* (2013.01); *B60W 2710/20* (2013.01); *B60W 2720/106* (2013.01)

(58) Field of Classification Search
CPC ....... B60W 2530/00; B60W 2720/106; B60W 2710/20; B60W 2710/18; B60W 30/18109; B60W 2540/18; B60W 2540/12; B60W 2540/10; B60W 2720/103; B60W 60/0057; B60W 60/0053; G05D 1/0088; G05D 1/00
USPC ...................................................... 701/23, 26
See application file for complete search history.

(56) References Cited

U.S. PATENT DOCUMENTS

| | | | | |
|---|---|---|---|---|
| 9,956,961 | B2* | 5/2018 | Ishikawa | G05D 1/0061 |
| 2002/0095255 | A1* | 7/2002 | Minowa | B60K 31/0058 |
| | | | | 701/96 |
| 2009/0128318 | A1* | 5/2009 | Nagata | B60T 7/22 |
| | | | | 340/467 |
| 2015/0353088 | A1* | 12/2015 | Ishikawa | G05D 1/0061 |
| | | | | 701/23 |
| 2016/0041553 | A1* | 2/2016 | Sato | B60W 30/143 |
| | | | | 701/23 |
| 2017/0364070 | A1* | 12/2017 | Oba | G05D 1/0061 |
| 2018/0194364 | A1* | 7/2018 | Asakura | B60W 30/18163 |
| 2018/0314252 | A1* | 11/2018 | Asakura | G01C 21/3691 |
| 2019/0061772 | A1* | 2/2019 | Prinz | A61B 5/747 |
| 2019/0271981 | A1* | 9/2019 | Oba | B60W 50/14 |

FOREIGN PATENT DOCUMENTS

| | | |
|---|---|---|
| JP | 09-161196 | 6/1997 |
| JP | 09-323565 | 12/1997 |
| JP | 2008-001304 | 1/2008 |
| JP | 2008-230295 | 10/2008 |
| JP | 2014-044707 | 3/2014 |
| JP | 2015-178332 | 10/2015 |
| JP | 2015-182525 | 10/2015 |
| JP | 2015-230573 | 12/2015 |
| JP | 2016-196285 | 11/2016 |
| WO | 99/58359 | 11/1999 |

OTHER PUBLICATIONS

International Search Report and Written Opinion for International Patent Application No. PCT/JP2016/054883 dated May 17, 2016, 8 pages.
Chinese Office Action for Chinese Patent Application No. 201680081630.3 dated Sep. 1, 2020.

* cited by examiner

VEHICLE CONTROL DEVICE, VEHICLE CONTROL METHOD, AND VEHICLE CONTROL PROGRAM

TECHNICAL FIELD

The present invention relates to a vehicle control device, a vehicle control method, and a vehicle control program.

BACKGROUND ART

Recently, research on a technology of automatically controlling at least one of acceleration/deceleration, and steering of a host vehicle in order for the host vehicle to travel along a route up to a destination (hereinafter, referred to as "automatic driving"). In this regard, there is disclosed a technology of detecting that a vehicle approaches a scheduled point at which autonomous travel is to be switched to manual travel, of determining timing of operating a switching unit on the basis of a predetermined transition time necessary for completion of switching from the autonomous travel to the manual travel, and of encouraging a driver to operate the switching unit on the basis of the timing that is determined (for example, refer to Patent Literature 1).

CITATION LIST

Patent Literature

[Patent Literature 1]
Japanese Unexamined Patent Application, First Publication No. Hei 9-161196

SUMMARY OF INVENTION

Technical Problem

However, in the related art, in a case of terminating automatic driving, for example, control of allowing a vehicle occupant (a driver and the like) to perform manual driving at an appropriate timing is not performed, and thus it is difficult to smoothly transition to the manual driving.

The invention has been made in consideration of such circumstances, and an object thereof is to provide a vehicle control device, a vehicle control method, and a vehicle control program which are capable of realizing smooth transition from a driving mode in which automatic driving is performed to a driving mode in which the degree of the automatic driving is lower.

Solution to Problem

According to a first aspect of the invention, there is provided a vehicle control device (100) including: an automatic driving control unit (110) that executes a first driving mode in which at least one of acceleration/deceleration, and steering of a host vehicle is automatically controlled in order for the host vehicle to travel along a route up to a destination; and a specific situation transition control unit (132) that encourages a vehicle occupant of the host vehicle to transition to a second driving mode in which the degree of automatic driving is lower in comparison to the first driving mode by decelerating the host vehicle in a case of terminating execution of the first driving mode at a scheduled termination point of the first driving mode.

According to a second aspect, in the vehicle control device according to the first aspect, the specific situation transition control unit may set a transition completion point to a point before the scheduled termination point of the automatic driving to make a vehicle speed of the host vehicle be close to zero at the transition completion point.

According to a third aspect, the vehicle control device according to the first or second aspect may further include a hand-over control unit that switches the first driving mode to the second driving mode on the basis of operation content received by an operation device that is operated by the vehicle occupant. In a case where control of decelerating the host vehicle is performed by the specific situation transition control unit, the hand-over control unit may set a threshold value that is used in determination as to whether or not to switch the first driving mode to the second driving mode to a threshold value with which switching from the first driving mode to the second driving mode is easier in comparison to a threshold value in a case where the control of decelerating the host vehicle is not performed by the specific situation transition control unit.

According to a fourth aspect, in the vehicle control device according to any one of the first to third aspects, in a case of performing deceleration control to transition the host vehicle from the first driving mode to the second driving mode, the specific situation transition control unit may set at least one between a point at which the deceleration control is initiated and deceleration per unit time in correspondence with a current vehicle speed of the host vehicle.

According to a fifth aspect, the vehicle control device according to any one of the first to fourth aspects may further include an output unit that outputs information. In a case of terminating execution of the first driving mode at the scheduled termination point of the first driving mode, the specific situation transition control unit may cause the output unit to output information that encourages the vehicle occupant of the host vehicle to transition to the second driving mode.

According to a sixth aspect, in the vehicle control device according to any one of the first to fifth aspects, in a case of performing deceleration control to transition the host vehicle from the first driving mode to the second driving mode, the specific situation transition control unit may cause a braking force output device that outputs a braking force to output a braking force that intermittently increases or decreases.

According to a seventh aspect, in the vehicle control device according to any one of the first to fifth aspects, in a case of performing deceleration control to transition the host vehicle from the first driving mode to the second driving mode, the specific situation transition control unit may cause a braking force output device that outputs a braking force to output a braking force that is different in the degree of deceleration between a first half and a second half of a period of transitioning the first driving mode to the second driving mode.

According to an eighth aspect, in the vehicle control device according to the seventh aspect, the specific situation transition control unit may cause the braking force output device that outputs the braking force to output a braking force that reduces a speed in such a manner that a curve of a vehicle speed with the passage of time becomes upwardly convex up to a predetermined timing in a period of transitioning the first driving mode to the second driving mode, and the curve of the vehicle speed with the passage of time becomes downwardly convex after the predetermined timing.

According to a ninth aspect, there is provided a vehicle control method that is executed by an in-vehicle computer. The method includes: executing a first driving mode in which at least one of acceleration/deceleration, and steering of a host vehicle is automatically controlled in order for the host vehicle to travel along a route up to a destination; and urging a vehicle occupant of the host vehicle to transition to a second driving mode in which the degree of automatic driving is lower in comparison to the first driving mode by decelerating the host vehicle in a case of terminating execution of the first driving mode at a scheduled termination point of the first driving mode.

According to a tenth aspect, there is provided a vehicle control program that allows an in-vehicle computer to execute: a process of executing a first driving mode in which at least one of acceleration/deceleration, and steering of a host vehicle is automatically controlled in order for the host vehicle to travel along a route up to a destination; and a process of urging a vehicle occupant of the host vehicle to transition to a second driving mode in which the degree of automatic driving is lower in comparison to the first driving mode by decelerating the host vehicle in a case of terminating execution of the first driving mode at a scheduled termination point of the first driving mode.

Advantageous Effects of Invention

According to the first aspect, the ninth aspect, and the tenth aspect, in a case of terminating the automatic driving mode, the vehicle control device can encourage the vehicle occupant to transition from the automatic driving mode to the manual driving mode by decelerating the host vehicle. According to this, smooth transition from a driving mode in which automatic driving is performed to a driving mode in which the degree of automatic driving is lower is realized.

According to the second aspect, the vehicle control device sets the transition completion point to a point before the scheduled termination point of the automatic driving mode, and decelerates the host vehicle to make the vehicle speed of the host vehicle be close to zero at the transition completion point. According to this, it is possible to transition to the manual driving mode before reaching the scheduled termination point of the automatic driving mode.

According to the third aspect, the vehicle control device can perform switching to the manual driving mode during the deceleration control of urging the vehicle occupant of the host vehicle to transition to the manual driving mode.

According to the fourth aspect, the vehicle control device can perform an appropriate deceleration control in correspondence with a vehicle state.

According to the fifth aspect, the vehicle control device can more reliably notify the vehicle occupant of transition from the automatic driving to the manual driving mode (termination of the automatic driving mode control) by using information output from the output unit.

According to the sixth aspect, the seventh aspect, and the eighth aspect, the vehicle control device can more reliably notify the vehicle occupant of transition from the automatic driving mode to the manual driving mode (termination of the automatic driving mode control) by applying deceleration different from deceleration of a typical automatic driving mode to the host vehicle.

DESCRIPTION OF EMBODIMENTS

Hereinafter, an embodiment of a vehicle control device, a vehicle control method, and a vehicle control program of the invention will be described with reference to the accompanying drawings.

[Vehicle Configuration]

Figure 1:
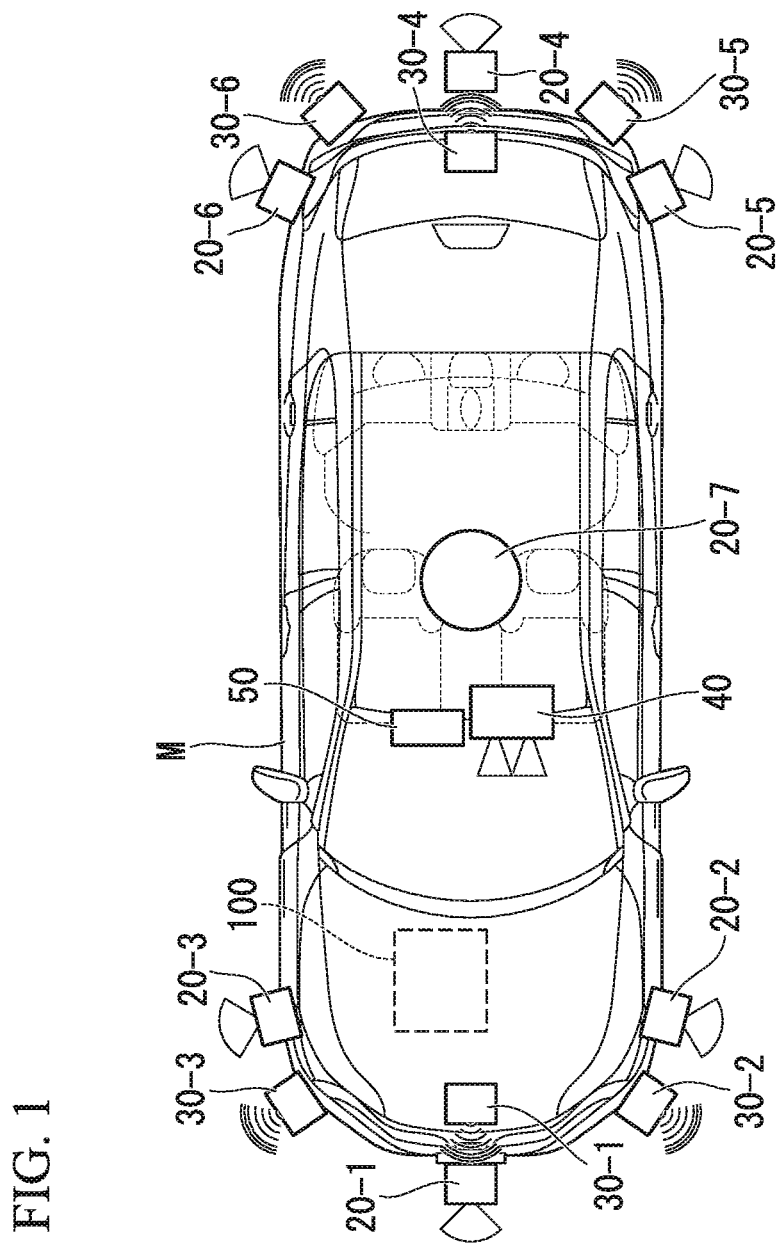
FIG. 1 is a view illustrating constituent elements of a vehicle on which a vehicle control device according to this embodiment is mounted.

FIG. 1 is a view illustrating constituent elements of a vehicle (hereinafter, referred to as "host vehicle M") on which a vehicle control device according to this embodiment is mounted. For example, a vehicle on which a vehicle control device 100 is mounted is a two-wheeled vehicle, a three-wheeled vehicle, a four-wheeled vehicle, or the like, and may be a vehicle that uses an internal combustion engine such as a diesel engine and a gasoline engine as a power source, an electric vehicle that uses an electric motor is as the power source, a hybrid vehicle including both the internal combustion engine and the electric motor, or the like. In addition, for example, the above-described electric vehicle is driven by using electric power that is discharged from a battery such as a secondary battery, a hydrogen fuel cell, a metallic fuel cell, and an alcohol fuel cell.

As illustrated in FIG. 1, sensors such as finders 20-1 to 20-7, radars 30-1 to 30-6, and camera 40, a navigation device 50, and the vehicle control device 100 are mounted on the host vehicle M. For example, the finders 20-1 to 20-7 are a light detection and ranging or a laser imaging detection and ranging (LIDAR) that measures scattered light with respect to irradiation light and measures a distance up to a target. For example, the finder 20-1 is attached to a front grille and the like, and the finders 20-2 and 20-3 are attached to a lateral surface of a vehicle body, a door mirror, the inside of a headlight, the vicinity of a side lamp, and the like. The finder 20-4 is attached to a trunk lid, and the like, and the finders 20-5 and 20-6 are attached to a lateral surface of the vehicle, the inside of a tail lamp, and the like. For example, the above-described finders 20-1 to 20-6 have a detection region of approximately 150° with respect to a horizontal direction. In addition, the finder 20-7 is attached to a roof and the like. For example, the finder 20-7 has a detection region of 360° with respect to the horizontal direction.

For example, the above-described radars 30-1 and 30-4 are long range millimeter wave radars in which a detection region in a depth direction is wider in comparison to other radars. In addition, the radars 30-2, 30-3, 30-5, and 30-6 are intermediate range millimeter radars in which a detection region in the depth direction is narrower in comparison to the radars 30-1 and 30-4. Hereinafter, in a case where the finders 20-1 to 20-7 are not particularly discriminated, the finders 20-1 to 20-7 are simply described as "finder 20". In a case where the radars 30-1 to 30-6 are not particularly discriminated, the radars 30-1 to 30-6 are simply described as "radar 30". For example, the radar 30 detects presence or absence of an object (for example, a nearby vehicle (another vehicle), obstacles, and the like) near the host vehicle M, a distance up to the object, a relative velocity, and the like by a frequency modulated continuous wave (FM-CW) method and the like.

For example, the camera 40 is a digital camera that uses an individual imaging element such as a charge coupled device (CCD) and a complementary metal oxide semiconductor (CMOS). The camera 40 is attached to an upper side of a windshield, a rear surface of a rearview mirror, and the like. For example, the camera 40 periodically and repetitively captures an image of the area in front of the host vehicle M.

In addition, the configurations illustrated in FIG. 1 are illustrative only, and parts of the configurations may be omitted or other configurations may be added.

[Functional Configuration]

Figure 2:
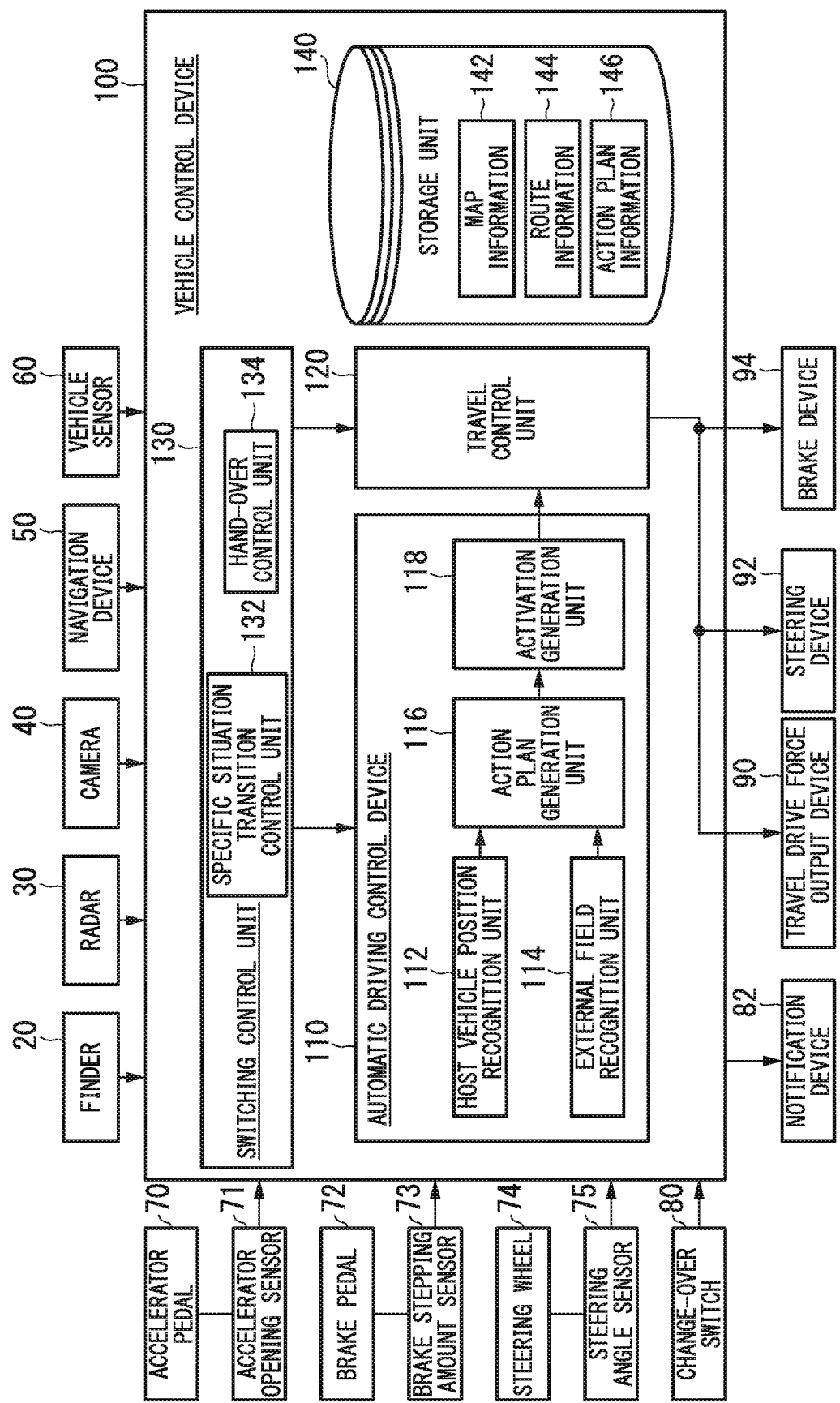
FIG. 2 is a functional configuration diagram of a host vehicle M on which a vehicle control device 100 according to this embodiment is mounted.

FIG. 2 is a functional configuration diagram of the host vehicle M on which the vehicle control device 100 according to this embodiment is mounted. In addition to the finder 20, the radar 30, and the camera 40, the navigation device 50, a vehicle sensor 60, operation devices such as an accelerator pedal 70, a brake pedal 72, and a steering wheel 74, operation detection sensors such as an accelerator opening sensor 71, a brake stepping amount sensor (brake switch) 73, and a steering angle sensor (or a steering torque sensor) 75, a change-over switch 80, a notification device (output unit) 82, a travel drive force output device 90, a steering device 92, a brake device 94, and the vehicle control device 100 are mounted on the host vehicle M. The devices or apparatuses are connected to each other through a multiplex communication line such as a controller area network (CAN) communication line, a serial communication line, a radio communication line, and the like. In addition, the operation devices which are exemplified are illustrative only, and a joystick, a button, a dial switch, a graphical user interface (GUI) switch, and the like may be mounted on the host vehicle M.

The navigation device 50 includes global navigation satellite system (GNSS) receiver and map information (navigation map), a touch panel type display device that functions as a user interface, a speaker, a microphone, and the like. The navigation device 50 specifies a position of the host vehicle M by the GNSS receiver, and derives a route from the position to a destination that is designated by a user. The route derived by the navigation device 50 is stored in a storage unit 140 as route information 144. The position of the host vehicle M may be specified or supplemented by an inertial navigation system (INS) that uses an output of the vehicle sensor 60. In addition, when the vehicle control device 100 executes a manual driving mode, the navigation device 50 performs guidance with respect to the route up to the destination with a voice or navigation display. In addition, the configuration that specifies the position of the host vehicle M may be provided independently from the navigation device 50. In addition, the navigation device 50 may be realized, for example, by one function of a terminal device such as a smart phone and a tablet terminal which are carried by a user. In this case, information is transmitted and received between the terminal device and the vehicle control device 100 by wireless or wired communication.

The vehicle sensor 60 includes a vehicle speed sensor that detects a vehicle speed, an acceleration sensor that detects acceleration, a yaw rate sensor that detects an angular velocity around a vertical axis, an orientation sensor that detects a direction of the host vehicle M, and the like.

The operation detection sensors output an accelerator opening, a brake stepping amount, and a steering angle as a detection result to the vehicle control device 100. In addition, alternatively, a detection result of the operation detection sensors may be directly output to the travel drive force output device 90, the steering device 92, or the brake device 94 in accordance with a driving mode.

The change-over switch 80 is a switch that is operated by a vehicle occupant. The change-over switch 80 receives an operation of the vehicle occupant, and performs switching of a driving mode (for example, an automatic driving mode (first driving mode), and a manual driving mode (second driving mode)) in correspondence with operation content that is received. For example, the change-over switch 80 generates a driving mode designation signal that designates a driving mode of the host vehicle M from the operation content of the vehicle occupant, and outputs the signal to a switching control unit 130.

The notification device 82 is one of various devices capable of outputting information. For example, the notification device 82 outputs information that encourages a vehicle occupant of the host vehicle M to transition to the manual driving mode from the manual driving mode. As the notification device 82, for example, at least one of a speaker, a vibrator, a display device, a light-emitting device, and the like is used.

For example, the travel drive force output device 90 is provided with an engine and an engine electronic control unit (ECU) that controls the engine in a case where the host vehicle M is a vehicle that uses an internal combustion engine as a power source, a travel motor and a motor ECU that controls the travel motor in a case where the host vehicle M is an electric vehicle that uses an electric motor as the power source, or the engine, the engine ECU, the travel motor, and the motor ECU in a case where the host vehicle M is a hybrid vehicle. In a case where the travel drive force output device 90 includes only the engine, the engine ECU adjusts an throttle opening of the engine, a shift stage, and the like in accordance with information input from a travel control unit 120 to be described later, and outputs a travel drive force (torque) for travel of the vehicle. In addition, in a case where the travel drive force output device 90 includes only the travel motor, the motor ECU adjusts a duty ratio of a PWM signal that is applied to the travel motor in accordance with information input from the travel control unit 120, and outputs the above-described travel drive force. In addition, in a case where the travel drive force output device 90 includes both the engine and the travel motor, both the engine ECU and the motor ECU controls the travel drive force in cooperation with each other in accordance with information input from the travel control unit 120.

For example, the steering device 92 includes an electric motor. For example, the electric motor applies a force to a rack and pinion mechanism to change a direction of a steering wheel. The steering device 92 drives the electric motor in accordance with information input from the travel control unit 120 to change the direction of the steering wheel.

For example, the brake device 94 is an electric servo-brake device including a brake caliper, a cylinder that transmit a hydraulic pressure to the brake caliper, an electric motor that generates the hydraulic pressure in the cylinder, and a braking control unit. The braking control unit of the electric servo-brake device controls the electric motor in accordance with information input from the travel control unit 120 to allow brake torque (braking force output device) that outputs a braking force according to a braking operation to be output to respective wheels. The electric servo-brake device may include a mechanism that transmits a hydraulic pressure generated by an operation of the brake pedal to the cylinder through a master cylinder as a backup mechanism. In addition, the brake device 94 may be an electronic control type hydraulic brake device without limitation to the above-described electric servo-brake device. The electronic control type hydraulic brake device controls an actuator in accordance with information input from the travel control unit 120 to transmit a hydraulic pressure of the master cylinder to the cylinder. In addition, the brake device 94 may include a regenerative brake realized by a travel motor that can be included in the travel drive force output device 90.

[Vehicle Control Device]

Hereinafter, the vehicle control device 100 will be described. For example, the vehicle control device 100 includes an automatic driving control unit 110, the travel control unit 120, the switching control unit 130, and the storage unit 140. For example, the automatic driving control unit 110 includes a host vehicle position recognition unit 112, an external field recognition unit 114, an action plan generation unit 116, and a trajectory generation unit 118. Some or the entirety of respective units of the automatic driving control unit 110, the travel control unit 120, and the switching control unit 130 are realized when a processor such as a central processing unit (CPU) executes a program. In addition, some or the entirety of the units may be realized by hardware such as large scale integration (LSI) and an application specific integrated circuit (ASIC). In addition, the storage unit 140 is realized by a read only memory (ROM), a random access memory (RAM), a hard disk drive (HDD), a flash memory, and the like. The program that is executed by the processor may be stored in the storage unit 140 in advance, or may be downloaded from an external device through in-vehicle internet equipment, and the like. In addition, the program may be installed in the storage unit 140 when a portable storage medium that stores the program is mounted in a drive device (not illustrated). In addition, the vehicle control device 100 may be dispersed among a plurality of computer devices. According to this, various processes according to this embodiment can be realized through cooperation of the hardware functional units and software composed of a program and the like with respect to an in-vehicle computer of the host vehicle M.

The automatic driving control unit 110 performs control by switching a driving mode in accordance with an instruction transmitted from the switching control unit 130. Examples of the driving mode includes a driving mode (automatic driving mode) in which acceleration/deceleration, and steering of the host vehicle M are automatically controlled, and a driving mode (manual driving mode) in which acceleration/deceleration of the host vehicle M are controlled on the basis of an operation with respect to an operation device such as the accelerator pedal 70 or the brake pedal 72, and steering is controlled on the basis of an operation with respect to an operation device such as the steering wheel 74, but there is no limitation to the driving modes. As another driving mode, for example, a driving mode (semi-automatic driving mode) in which one of the acceleration/deceleration, and the steering of the host vehicle M is automatically controlled, and the other is controlled on the basis of an operation with respect to the operation device may be included.

In a case where the first driving mode is the automatic driving mode, the second driving mode may be the manual driving mode or the semi-automatic driving mode. In a case where the first driving mode is the semi-automatic driving mode, the second driving mode is the manual driving mode. That is, in the second driving mode, the degree of automatic driving is lower in comparison to the first driving mode. In the following description, description will be made on the assumption that the first driving mode is the automatic driving mode, and the second driving mode is the manual driving mode. In addition, in execution of the manual driving mode, the automatic driving control unit 110 stop an operation thereof, and an input signal transmitted from the operation detection sensors may be supplied to the travel control unit 120, or may be directly supplied to the travel drive force output device 90, the steering device 92, or the brake device 94.

The automatic driving control unit 110 includes the host vehicle position recognition unit 112, the external field recognition unit 114, the action plan generation unit 116, and the trajectory generation unit 118. The host vehicle position recognition unit 112 recognizes a lane (travel lane) in which the host vehicle M is travelling, and a relative position of the host vehicle M with respect to the travel lane on the basis of map information 142 that is stored in the storage unit 140, and information that is input from the finder 20, the radars 30, the camera 40, the navigation device 50, or the vehicle sensor 60. For example, the map information 142 is map information with higher accuracy in comparison to a navigation map included in the navigation device 50, and includes information of the center of the lane, information of a boundary of the lane, and the like. More specifically, the map information 142 includes road information, traffic regulation information, address information (addresses, postal codes), facility information, telephone number information, and the like. The road information includes information indicating a road type such as an expressway, a toll road, a national road, and a prefectural road, and information such as the number of lanes of a road, a width of each lane, a gradient of a road, a position of a road (three-dimensional coordinates including a longitude, a latitude, and height), a curvature of a curve of a road, a position of a joining point and a diverging point of lanes, a sign installed on the road. The traffic regulation information includes information indicating as a situation in which lanes are blocked due to construction, traffic accidents, traffic congestion, and the like.

Figure 3:
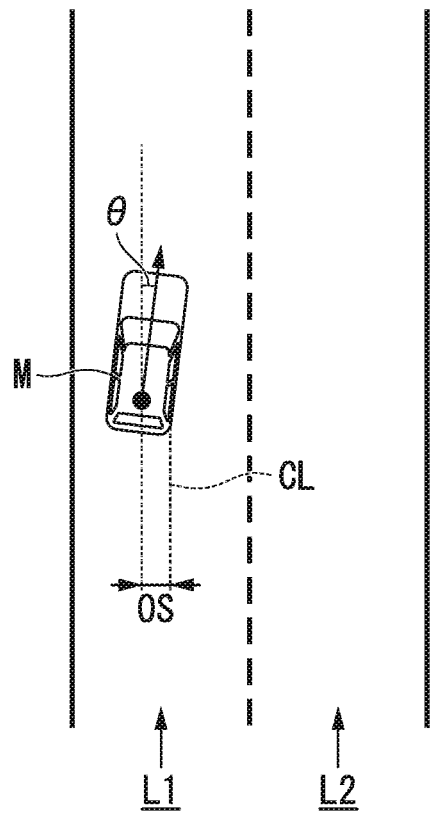
FIG. 3 is a view illustrating an aspect in which a relative position of the host vehicle M with respect to a travel lane L1 is recognized by a host vehicle position recognition unit 112.

FIG. 3 is a view illustrating an aspect in which a relative position of the host vehicle M with respect to a travel lane L1 is recognized by the host vehicle position recognition unit 112. For example, the host vehicle position recognition unit 112 recognizes a deviation OS of a reference point (for example, the center of gravity) of the host vehicle M from the travel lane center CL, and an angle θ of a propagation direction of the host vehicle M with respect to a line obtained by connecting travel lane centers CL as a relative position of the host vehicle M with respect to the travel lane L1. In addition, alternatively, the host vehicle position recognition unit 112 may recognize a position of the reference point of the host vehicle M with respect to any lateral end of the host vehicle lane L1, and the like as the relative position of the host vehicle M with respect to the travel lane.

The external field recognition unit 114 recognizes a state such as a position, a velocity, and an acceleration of a nearby vehicle on the basis of information input from the finder 20, the radar 30, the camera 40, and the like. The nearby vehicle in this embodiment is a vehicle that travels in the vicinity of the host vehicle M and travels in the same direction as the host vehicle M. The position of the nearby vehicle may be indicated as a representative position such as the center of gravity and a corner of another vehicle, or may be indicated as a region that is expressed as a contour of the other vehicle. The "state" of the nearby vehicle may include a state in which acceleration of the nearby vehicle, and whether or not the nearby vehicle is changing a lane (or whether or not the nearby vehicle intends to change lanes) on the basis of information of the various devices. In addition, the external field recognition unit 114 may recognize positions of a guard rail, an electric pole, a parked vehicle, a pedestrian, and other objects in addition to the nearby vehicle.

The action plan generation unit 116 sets an initiation point of automatic driving, a scheduled termination point of automatic driving, and/or a destination of automatic driving. The initiation point of automatic driving may be a current position of the host vehicle M, or a point at which an operation of instructing automatic driving is performed by a vehicle occupant. The action plan generation unit 116 generates an action plan in a section between the initiation point and the scheduled termination point, or a section between the initiation point and a destination of automatic driving. In addition, there is no limitation thereto, and the action plan generation unit 116 may generate the action plan with respect to an arbitrary section.

For example, the action plan includes a plurality of events which are sequentially executed. Examples of the events include a deceleration event of decelerating the host vehicle M, an acceleration event of accelerating the host vehicle M, a lane keeping event of allowing the host vehicle M to travel without deviating from a travel lane, a lane changing event of changing the travel lane, a passing event of allowing the host vehicle M to pass a preceding vehicle, a diverging event of changing a lane to a desired lane at a diverging point or allowing the host vehicle M to travel without deviating from the current travel lane, a joining event of accelerating or decelerating the host vehicle M at a joining lane to be joined to a main lane, and changing a travel lane, and the like. For example, when there is a junction (diverging point) on a toll road (for example, an expressway), the vehicle control device 100 changes a lane or keeps the lane so that the host vehicle M proceeds in a destination direction. Accordingly, in a case where it is determined that a junction exists on a route with reference to the map information 142, the action plan generation unit 116 sets the lane changing event for lane change to a desired lane in which it is possible to proceed in a direction of a destination in a section between a current position (coordinates) of the host vehicle M and a position (coordinates) of the junction. In addition, information indicating an action plan generated by the action plan generation unit 116 is stored in the storage unit 140 as action plan information 146.

Figure 4:
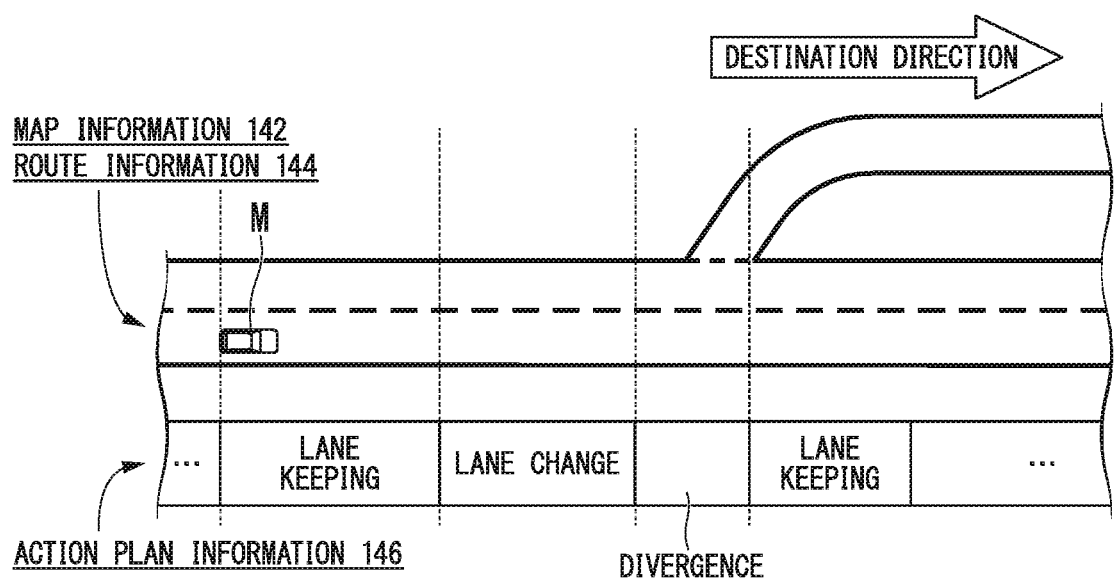
FIG. 4 is a view illustrating an example of an action plan that is generated with respect to an arbitrary section.

FIG. 4 is a view illustrating an example of an action plan that is generated with respect to an arbitrary section. As illustrated in FIG. 4, the action plan generation unit 116 classifies situations which occur in a case of traveling along a route to a destination, and generates an action plan so that events appropriate for individual situations occur. In addition, the action plan generation unit 116 may dynamically change the action plan in correspondence with a situation variation of the host vehicle M.

For example, the action plan generation unit 116 may change (update) the generated action plan on the basis of an external field state that is recognized by the external field recognition unit 114. Typically, when a vehicle is travelling, the external field state continuously varies. Particularly, in a case where the host vehicle M travels on a road including a plurality of lanes, a distance interval from another vehicle relatively varies. For example, in a case where a proceeding vehicle decelerates through abrupt braking or a vehicle that travels in an adjacent lane cuts in front of the host vehicle M, it is necessary for the host vehicle M to travel while appropriately changing a speed or a lane in conformity with a behavior of the preceding vehicle or the vehicle in the adjacent lane. Accordingly, the action plan generation unit 116 may change an event that is set for every control section in correspondence with the above-described external field state variation.

Specifically, in a case where a speed of another vehicle recognized by the external field recognition unit 114 in travel exceeds a threshold value, or a movement direction of another vehicle that travels in a lane adjacent to a host lane faces a host lane direction, the action plan generation unit 116 changes an event that is set in a driving section along which the host vehicle M is scheduled to travel. For example, when the lane changing event is set to be executed after the lane keeping event, if it is determined by a recognition result of the external field recognition unit 114 that a vehicle proceeds at a speed equal to or higher than a threshold value from a backward side of a lane that is a lane changing destination during the lane keeping event, the action plan generation unit 116 changes an event subsequent to the lane keeping event from the lane changing event to the deceleration event, the lane keeping event and the like. As a result, even in a case where a variation occurs in the external field state, the vehicle control device 100 can allow the host vehicle M to stably perform autonomous driving.

[Lane Keeping Event]

When performing the lane keeping event, the action plan generation unit 116 determines any one travel aspect among constant speed travel, following travel, deceleration travel, curve travel, obstacle avoiding travel, and the like. For example, in a case where another vehicle does not exist in front of the host vehicle M, the action plan generation unit 116 determines the travel aspect as the constant speed travel. In addition, in a case of performing the following travel with respect to a preceding vehicle, the action plan generation unit 116 determines the travel aspect as the following travel. In addition, in a case where deceleration of a preceding vehicle is recognized by the external field recognition unit 114 or in a case of performing an event such as stopping and parking, the action plan generation unit 116 determines the travel aspect as the deceleration travel. In addition, in a case where the external field recognition unit 114 recognizes that the host vehicle M reaches a curved road, the action plan generation unit 116 determines the travel aspect as the curve travel. In addition, in a case where the external field recognition unit 114 recognizes an obstacle in front of the host vehicle M, the action plan generation unit 116 determines the travel aspect as the obstacle avoiding travel.

The trajectory generation unit 118 generates a trajectory on the basis of the travel aspect that is determined by the action plan generation unit 116. The trajectory is an aggregation (trajectory) of points obtained by sampling future target positions assumed to reach for every predetermined time in a case where the host vehicle M travels on the basis of a travel aspect that is determined by the action plan generation unit 116. The trajectory generation unit 118 calculates a target speed of the host vehicle M at least on the basis of a speed of a target object that is recognized by the host vehicle position recognition unit 112 or the external field recognition unit 114 and exists in front of the host vehicle M, and a distance between the host vehicle M and the target object. The trajectory generation unit 118 generates a trajectory on the basis of the target speed that is calculated. The target object includes a preceding vehicle, points such as a joining point, a diverging point, and a target point, objects such as an obstacle, and the like.

Figure 5:
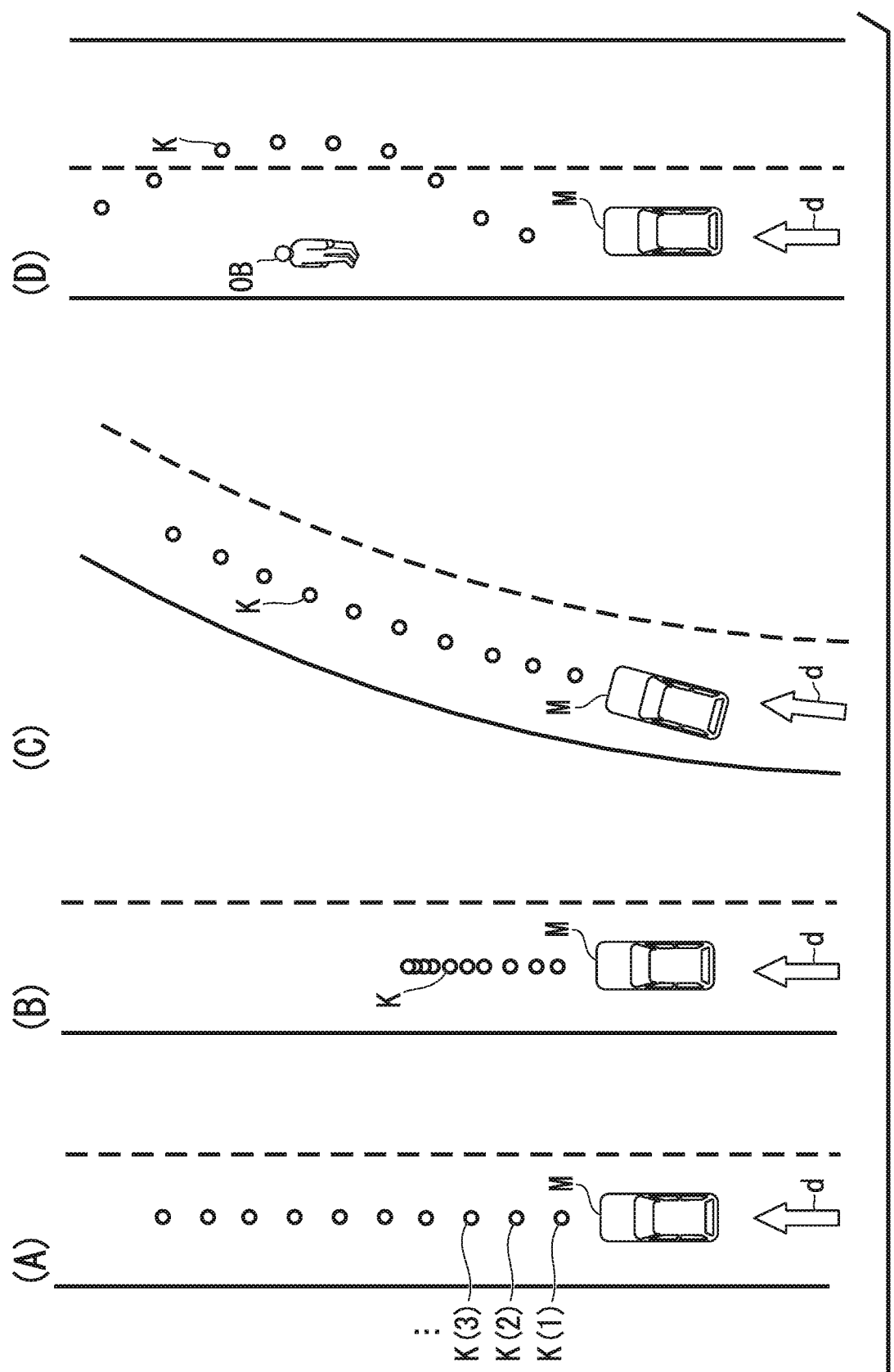
FIG. 5 is a view illustrating an example of a trajectory that is generated by a trajectory generation unit 118.

Hereinafter, description will be given of generation of a trajectory with focus given to the automatic driving mode, particularly, in a case where existence of the target object is not considered and a case where existence of the target object is considered. FIG. 5 is a view illustrating an example of a trajectory that is generated by the trajectory generation unit 118. As illustrated in FIG. 5(A), for example, the trajectory generation unit 118 sets future target positions such as K(1), K(2), K(3), . . . as a trajectory of the host vehicle M with reference to the current position of the host vehicle M whenever a predetermined time Δt has passed from the current time. Hereinafter, in a case where the target positions are not discriminated, the target positions are simply described as "target position K". For example, the number of the target positions K is determined in correspondence with a target time T. For example, in a case where the target time T is set to 5 seconds, the trajectory generation unit 118 sets the target positions K on the central line of a travel lane at intervals of a predetermined time Δt (for example, 0.1 seconds) for 5 seconds, and determines an arrangement interval of the plurality of target positions K on the basis of the travel aspect. For example, the trajectory generation unit 118 may derive the central line of the travel lane from information on a lane width and the like which are included in the map information 142. In addition, in a case where the position of the central line is included in the map information 142 in advance, the trajectory generation unit 118 may acquire the central line from the map information 142.

For example, in a case where the travel aspect is determined as the constant speed travel by the action plan generation unit 116, as illustrated in FIG. 5(A), the trajectory generation unit 118 sets the plurality of target positions K at equal intervals and generates a trajectory.

In addition, in a case where the travel aspect is determined as the deceleration travel (also including a case where a preceding vehicle decelerates in the following travel) by the action plan generation unit 116, as illustrated in FIG. 5(B), the trajectory generation unit 118 generates a trajectory in the following manner Specifically, a wider interval is set for a target position K that will be reached at an earlier time. In addition, a narrower interval is set for a target position K that will be reached at a later time. In this case, a preceding vehicle may be set as an object OB, or points such as a joining point, a diverging point, and a target point, an obstacle, and the like other than the preceding vehicle may be set as the target OB. According to this, the target position K that will be reached at a later time from the host vehicle M becomes closer to the current position of the host vehicle M, and thus the travel control unit 120 to be described later decelerates the host vehicle M.

In addition, as illustrated in FIG. 5(C), in a case where the travel aspect is determined as the curve travel, for example, the trajectory generation unit 118 generates a trajectory by arranging the plurality of target positions K while changing a lateral position (position in a lane width direction) with respect to a propagation direction of the host vehicle M in correspondence with a curvature of a road. In addition, as illustrated in FIG. 5(D), in a case where an obstacle such as a person and a stopped vehicle exists on a road in front of the host vehicle M, the action plan generation unit 116 determines the travel aspect as the obstacle avoiding travel. In this case, the trajectory generation unit 118 generates a trajectory by arranging the plurality of target positions K so as to travel while avoiding the obstacle.

[Travel Control]

The travel control unit 120 sets the driving mode to the automatic driving mode, the manual driving mode, and the like in accordance with control by the switching control unit 130, and controls control targets including some or the entirety of the travel drive force output device 90, the steering device 92, and the brake device 94 in accordance with the driving mode that is set. In addition, the travel control unit 120 may appropriately adjust a control amount, which is determined, on the basis of a detection result of the vehicle sensor 60.

In a case where the automatic driving mode of the host vehicle M is performed, for example, the travel control unit 120 controls the travel drive force output device 90, the steering device 92, and the brake device 94 so that the host vehicle M passes through the trajectory generated by the trajectory generation unit 118 on scheduled time. In addition, in a case where the manual driving mode of the host vehicle M is performed, for example, the travel control unit 120 outputs an operation detection signal input from an operation detection sensor to the travel drive force output device 90, the steering device 92, and the brake device 94 as is. In addition, in a case where the semi-automatic driving mode of the host vehicle M is performed, for example, the travel control unit 120 may control the steering device 92 so that the host vehicle M travels along the trajectory that is generated by the trajectory generation unit 118, or may control the travel drive force output device 90 and the brake device 94 so that the host vehicle M travels at a predetermined speed.

[Switching Control]

The switching control unit 130 switches the driving modes on the basis of a driving mode designation signal that is input from the change-over switch 80. In addition, the switching control unit 130 switches the driving modes on the basis of an operation of instructing the operation devices to perform acceleration, deceleration, or steering. In addition, the switching control unit 130 performs a hand-over control for transition from the automatic driving mode to the manual driving mode in the vicinity of a scheduled termination point of the automatic driving mode which is set by the action plan information 146 and the like.

For example, the switching control unit 130 includes a specific situation transition control unit 132 and a hand-over control unit 134. The specific situation transition control unit 132 performs control of decelerating the host vehicle M at a specific situation such as hand-over in which the automatic driving mode is terminated at a scheduled termination point of the automatic driving mode and the driving mode transitions to the manual driving mode. When the acceleration control is performed, it is possible to encourage a vehicle occupant of the host vehicle M to transition to the manual driving mode from the automatic driving mode of the host vehicle M.

Figure 6:
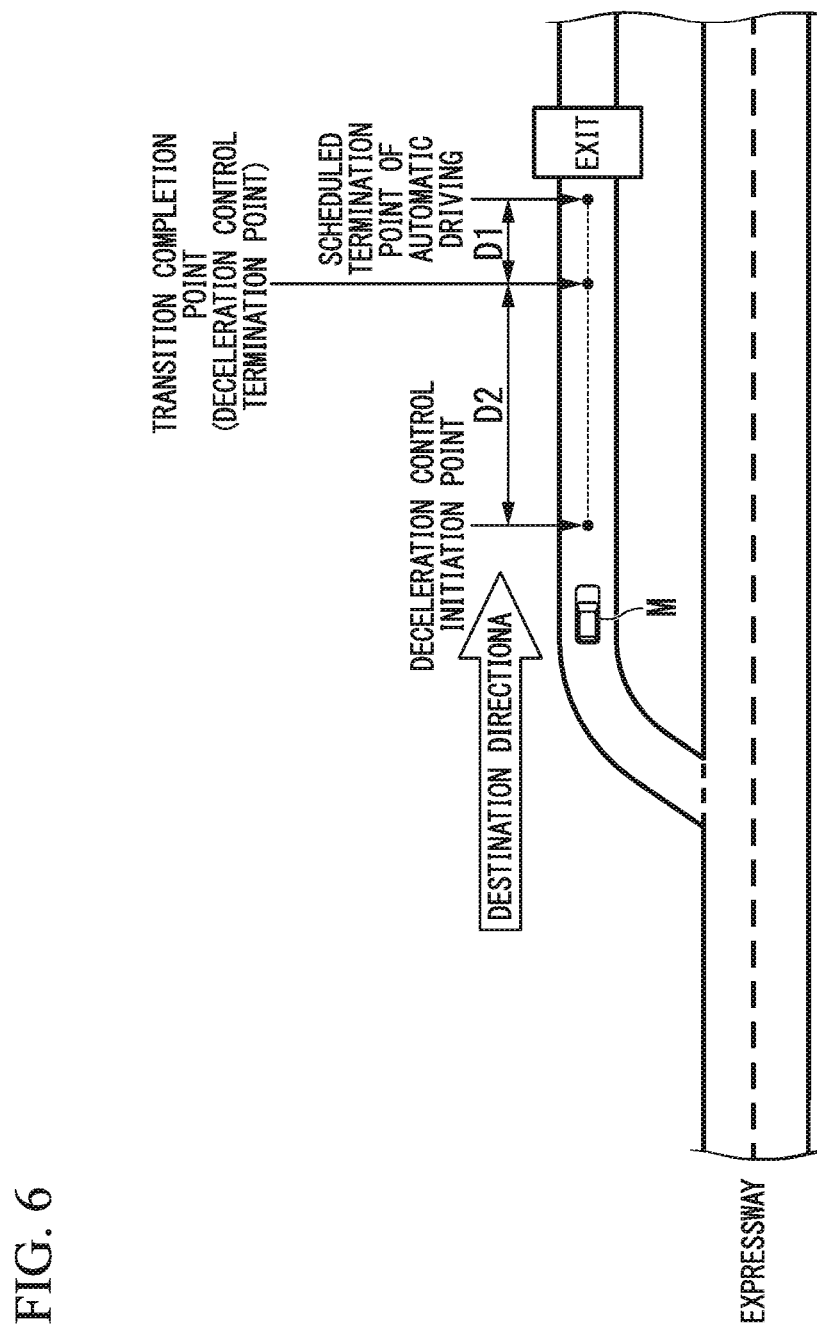
FIG. 6 is a view illustrating an aspect of deceleration control according to this embodiment.

FIG. 6 is a view illustrating an aspect of the deceleration control according to this embodiment. As illustrated in FIG. 6, for example, in a case where the host vehicle M is scheduled to get off an expressway, the scheduled termination point of the automatic driving mode is set to a point in front of a tollgate (exit) of the expressway. In a case where the scheduled termination point of the automatic driving mode is in a predetermined range from a travel point, the specific situation transition control unit 132 performs deceleration control of urging the vehicle occupant of the host vehicle M to transition to the manual driving mode.

In a case of performing the deceleration control, the specific situation transition control unit 132 may set a point at which the deceleration control is terminated (transition completion point) at a position (position of a distance D1 in FIG. 6) before the scheduled termination point of the automatic driving mode. For example, the distance D1 is approximately 10 m, but there is no limitation thereto. In addition, the specific situation transition control unit 132 specifies a vehicle speed of the host vehicle M, and sets at least one between a point at which the deceleration control is initiated, and deceleration per unit time from the vehicle speed that is specified. In addition, the specific situation transition control unit 132 may perform setting as follows on the basis of a vehicle weight that is set for every vehicle. For example, the heavier the vehicle weight is, the longer the distance D2 set between the deceleration control initiation point and the transition completion point is.

In addition, when the host vehicle M reaches the deceleration control initiation point, the specific situation transition control unit 132 performs deceleration control of urging the vehicle occupant of the host vehicle M to perform the hand-over between the deceleration control initiation point and the transition completion point illustrated in FIG. 6 (a section D2 illustrated in FIG. 6). In addition, the specific situation transition control unit 132 performs a deceleration operation so that the host vehicle M stops (a speed becomes zero (0)) at the transition completion point from a speed state of the deceleration control initiation point. According to this, even in a situation in which the vehicle occupant of the host vehicle M is difficult to hand over, the host vehicle M finally stops, and thus it is possible to avoid continuation of the automatic driving state that is not suitable. However, a scheduled speed at the transition completion point is not limited to zero (0).

Figure 7:
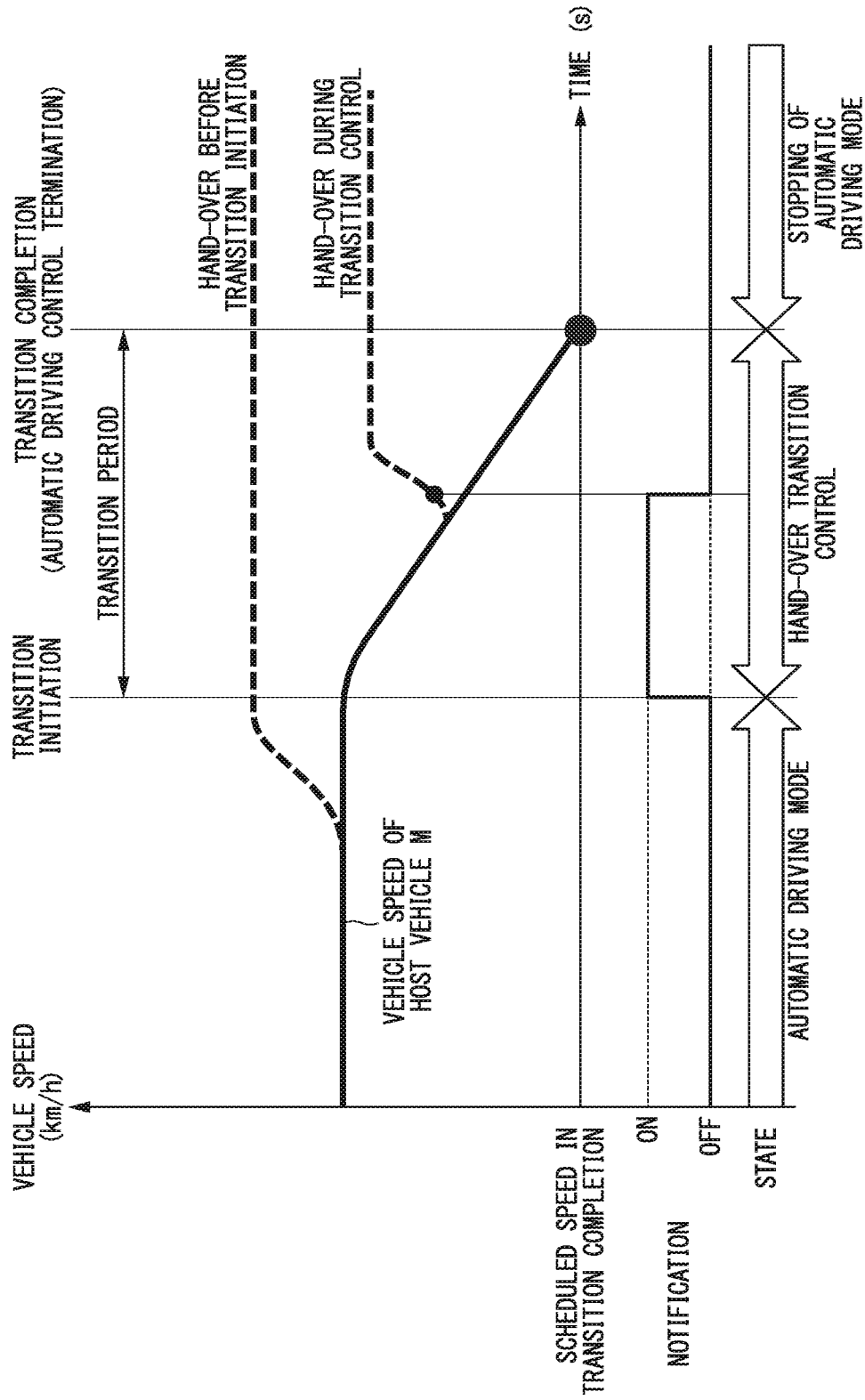
FIG. 7 is a view illustrating an aspect of a transition from an automatic driving mode to a manual driving mode.

FIG. 7 is a view illustrating an aspect of a transition from the automatic driving mode to the manual driving mode. In a graph of FIG. 7, the horizontal axis represents time (s), and the vertical axis represents vehicle speed (km/h). The specific situation transition control unit 132 performs control of making the vehicle speed close to a scheduled speed (for example, zero speed) in a transition period from transition initiation to transition completion (automatic driving control termination) as illustrated in FIG. 7. For example, the transition period is approximately 10 to 15 (s) and the like, but there is no limitation thereto.

In addition, in a case of performing deceleration control corresponding to the hand-over transition control from the automatic driving mode state, the specific situation transition control unit 132 sets at least one between a point at which the deceleration control is initiated and deceleration per unit time from a vehicle speed at the current point of time of the host vehicle M. The deceleration per unit time may be a fixed value, or may be changed in correspondence with a distance or time from the current point to the transition completion point with the passage of time.

Figure 8:
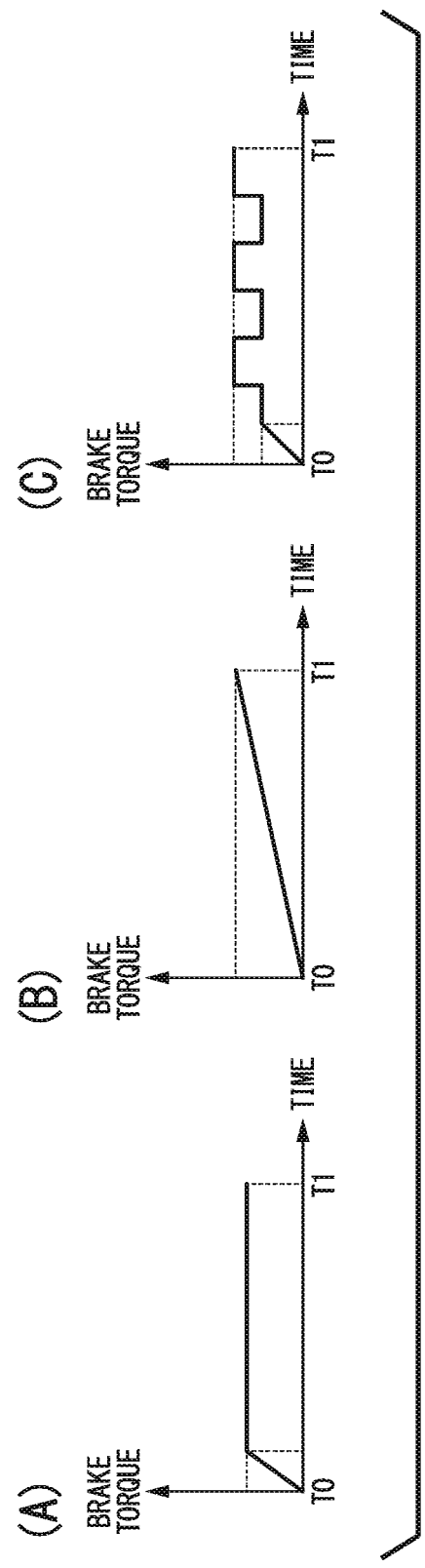
FIG. 8 is a view illustrating an example of brake control with respect to the deceleration control.

FIG. 8 is a view illustrating an example of brake control with respect to the deceleration control. In addition, in FIGS. 8(A) to 8(C), the horizontal axis represents time, and the vertical axis represents brake torque that is output from the brake device 94 in the deceleration control at the specific situation transition control unit 132. In addition, in FIGS. 8(A) to 8(C), a time T0 represents a transition initiation point of time at which the automatic driving mode of the host vehicle M transitions to the manual driving mode, and a time T1 represents a transition completion point of time.

The specific situation transition control unit 132 executes deceleration of the host vehicle M by controlling brake torque (braking force output device) of the brake device 94 through the travel control unit 120. In this case, as illustrated in FIG. 8(A), the specific situation transition control unit 132 initiates braking from a point of time of a time T0, increases brake torque until the brake torque becomes a predetermined value, and outputs a constant braking force to the brake torque up to a time T1. According to this, it is possible to smoothly decelerate the host vehicle M in proportional to time as illustrated in FIG. 7. In addition, as illustrated in FIG. 8(B), in a transition period from the time T0 to the time T1, the specific situation transition control unit 132 may output a braking force that increases in proportional to time to the brake torque. In addition, as illustrated in FIG. 8(C), in the transition period from the time T0 to the time T1, the specific situation transition control unit 132 may output a braking force that intermittently increases or decreases to the brake torque. According to this, the deceleration of the host vehicle M is allowed to vary in the transition period, and minute fluctuation is generated with respect to a propagation direction of the host vehicle M. As a result, it is possible to more clearly notify the vehicle occupant of the host vehicle M of a situation in which it is necessary to transition to the hand-over. In addition, the deceleration control method in the specific situation transition control unit 132 is not limited to the above-described methods.

Figure 9:
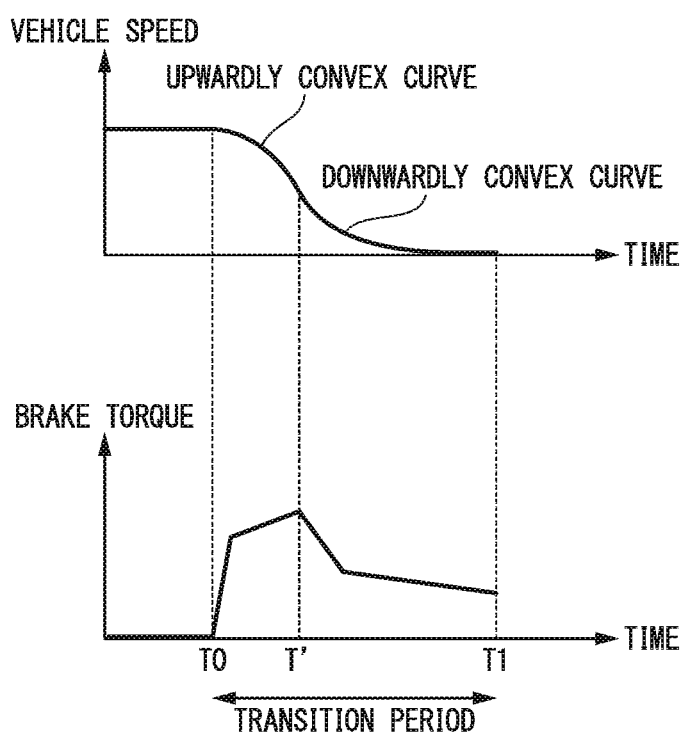
FIG. 9 is a view illustrating another example of the brake control with respect to the deceleration control.

FIG. 9 is a view illustrating another example of the brake control with respect to the deceleration control. The example of FIG. 9 illustrates a relationship between control of the brake torque in the transition period from the time T0 to the time T1 in which the automatic driving mode transitions to the manual driving mode, and a vehicle speed of the host vehicle M. In a case of performing the deceleration control of allowing the host vehicle M to transition from the automatic driving mode to the manual driving mode, the specific situation transition control unit 132 outputs a braking force different in the degree of deceleration between the first half and the second half of the transition period to the brake torque that outputs a braking force, and the like. For example, in a case of performing the deceleration control, the specific situation transition control unit 132 performs control of increasing an output of the braking force by the brake torque so that the degree of deceleration gradually increases in the first half (period from a time T0 to a time T' illustrated in FIG. 9) of the transition period, and performs control of decreasing the output of the braking force by the brake torque so that the degree of deceleration gradually decreases in the second half (period from the time T' to a time T1 illustrated in FIG. 9) of the transition period. In addition, the control contents in the first half and the second half of the transition period may be reversed from each other.

For example, as illustrated in FIG. 9, the specific situation transition control unit 132 outputs a braking force, which reduces a speed in such a manner that a curve of the vehicle speed of the host vehicle M with the passage of time becomes upwardly convex up to a predetermined timing from initiation of the transition period, and reduces the speed in such a manner that the curve of the vehicle speed of the host vehicle M with the passage of time becomes downwardly convex after the predetermined timing, to the brake torque. As described above, the specific situation transition control unit 132 applies deceleration different from deceleration of a typical automatic driving mode to the host vehicle M. Accordingly, it is possible to more reliably notify the vehicle occupant of a transition from the automatic driving mode to the manual driving mode. The deceleration control in the specific situation transition control unit 132 may be changed in correspondence with a travel state of the host vehicle M, or may be set in advance by the vehicle occupant or a manufacture of the host vehicle M, and the like.

In a case where an operation amount and/or an operation time with respect to at least one operation device among the accelerator pedal 70, the brake pedal 72, the steering wheel 74, and the like exceed a threshold value that is set with respect to the operation amount or the operation time, the hand-over control unit 134 performs control of transitioning a driving mode to the hand-over. Here, the operation amount can be detected by operation detection sensors (the accelerator opening sensor 71, the brake stepping amount sensor (brake switch) 73, and the steering angle sensor 75) corresponding to the operation devices, and the like. The operation amount represents the accelerator opening, the brake stepping amount, the steering angle, a part or the entirety of steering torque, or a variation amount thereof. In addition, for example, the operation time can be acquired by measuring time at which the operation is received by the operation devices.

In addition, in this embodiment, a touch sensor may be embedded in the steering wheel 74, and operation content with respect to steering by the vehicle occupant may be detected from a detection state of the touch sensor. As an example of the touch sensor, a sensor capable of understanding a variation in an electrostatic capacitance due to contact with a finger and the like, and the like can be used, and it is possible to detect contact of the steering wheel 74 with vehicle occupant's hands, a contact position thereof, and the like by using the sensor. In addition, when the contact position is detected, it is possible to detect whether or not the vehicle occupant grasps the steering wheel 74. In this case, time at which contact or grasping of the steering wheel 74 with the vehicle occupant' hands is detected may be acquired as the above-described operation time.

In addition, in a case where an increase or decrease value of the vehicle speed of the host vehicle M exceeds a predetermined threshold value due to an operation (for example, an acceleration operation, a deceleration operation, and the like) to the above-described operation devices, the hand-over control unit 134 may perform control of stopping the automatic driving mode by performing switching from the automatic driving mode to the manual driving mode.

In the example of FIG. 7, among the operation devices, time for which a variation in the accelerator opening is greater than a threshold value exceeds a defined operation time, the automatic driving mode is switched to the manual driving mode. For example, in a case where time for which the accelerator opening is greater than a threshold value A exceeds a defined operation time TA before initiation of the transition control to the hand-over by the specific situation transition control unit 132, the hand-over control unit 134 performs switching from the automatic driving mode to the manual driving mode.

In addition, during the transition control to the hand-over by the specific situation transition control unit 132, in a case where time for which the accelerator opening is greater than a threshold value B exceeds a defined operation time TB, the hand-over control unit 134 performs switching from the automatic driving mode to the manual driving mode. In addition, in this embodiment, at least one between a relationship of "threshold value A>threshold value B" and a relationship of "operation time TA>operation time TB" is established. According to this, during the transition control to the hand-over by the specific situation transition control unit 132, it is possible to quickly transition to the hand-over.

In addition, as illustrated in FIG. 7, the specific situation transition control unit 132 may perform control of initiating notification (notification ON) by the notification device 82 in combination with initiation of the deceleration control, and terminating notification (notification OFF) at a point of time at which transition to the hand-over is completed.

For example, in a case where the notification device 82 is a display unit such as a liquid crystal display (LCD) and an organic electroluminescence (EL) which are provided in the host vehicle M, the specific situation transition control unit 132 displays a message that encourages the hand-over on a screen of the display unit. In addition, the display unit may be a head-up display that displays an image in a visual field of the vehicle occupant by reflecting an image from a windshield of the host vehicle M, a display unit that is provided in the navigation device 50, or a display unit of an instrument panel that displays a state (speed and the like) of the host vehicle M. In addition, in a case where the notification device 82 is a speaker, the specific situation transition control unit 132 outputs a message, an alarm sound, and the like which encourages the hand-over from the speaker with a voice. In addition, in a case where the notification device 82 is a light-emitting device such as a light emitting diode (LED) lamp that is provided in the host vehicle M to encourage the hand-over, the specific situation transition control unit 132 lights or flickers the LED lamp. In addition, in a case where the notification device 82 is a vibrator that vibrates a sheet and the like of the host vehicle M, the specific situation transition control unit 132 vibrates a seat on which the vehicle occupant is seated by the vibrator. The specific situation transition control unit 132 gives a notification by using at least one among the above-described notification methods, but the notification methods are not limited thereto.

It is possible to smoothly transition from the automatic driving mode to the manual driving mode without using the change-over switch 80 due to the control by the specific situation transition control unit 132. In addition, in this embodiment, in the above-described transition control, switching from the automatic driving mode to the manual driving mode may be performed through switching to a driving mode by the change-over switch 80.

[Process Flow]

Hereinafter, a flow of the process by the vehicle control device 100 according to this embodiment will be described. In addition, in the following description, description will be given of a flow of the process of urging the vehicle occupant of the host vehicle M to transition to the manual driving mode from the automatic driving mode among the various processes in the vehicle control device 100.

Figure 10:
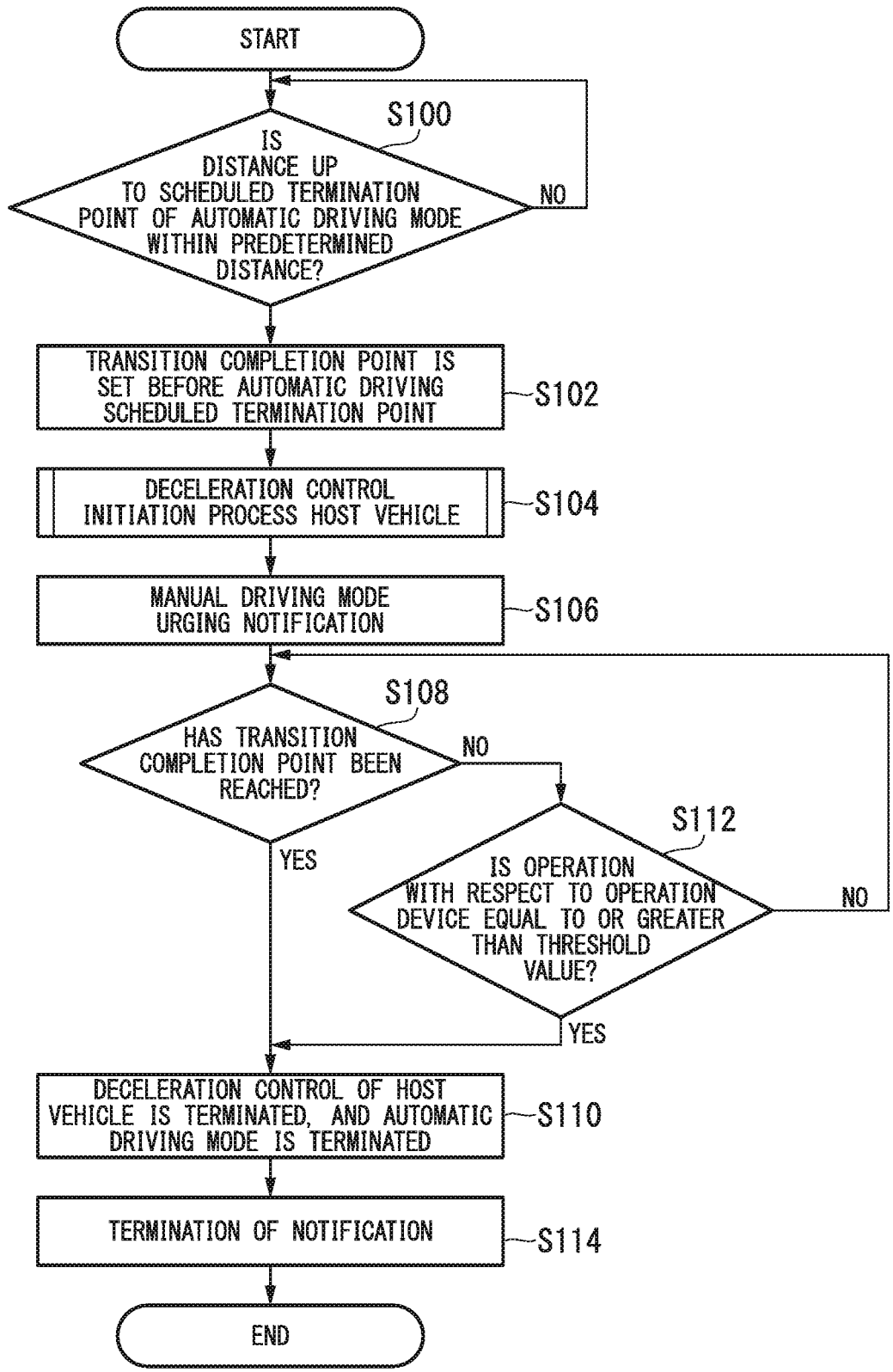
FIG. 10 is a flowchart illustrating an example of a driving transition control process according to this embodiment.

FIG. 10 is a flowchart illustrating an example of the driving transition control process according to this embodiment. In the example of FIG. 10, the specific situation transition control unit 132 determines whether or not a distance up to the scheduled termination point of the automatic driving mode is within a predetermined distance (or whether or not time until the host vehicle M reaches the scheduled termination point is within a predetermined time) (step S100). In a case where the distance up to the scheduled termination point of the automatic driving mode is within the predetermined distance, the specific situation transition control unit 132 sets the transition completion point to a point before an automatic driving mode termination point (for example, by 10 m and the like (step S102), and executes a deceleration control initiation process of the host vehicle M with reference to the set transition completion point (step S104). In addition, in this embodiment, the deceleration control process may be executed with reference to the automatic driving scheduled termination point without setting the transition completion point. Details of the process in step S104 will be described later. In addition, the specific situation transition control unit 132 allows the notification device 82 to notify the vehicle occupant of the host vehicle M of information that encourages the manual driving (hand-over) (step S106).

Next, the specific situation transition control unit 132 determines whether or not the host vehicle M has reached the transition completion point (step S108). In a case where the host vehicle M has reached the transition completion point, the specific situation transition control unit 132 terminates the deceleration control of the host vehicle M, and terminates the automatic driving mode (step S110). In addition, in a case where the host vehicle M has not reached the transition completion point, the hand-over control unit 134 determines whether or not an operation with respect to the operation devices is equal to or greater than a threshold value (step S112). In a case where, the operation is equal to or greater than the threshold value, it can be said that switching to the manual driving mode has been completed, and thus the hand-over control unit 134 terminates the deceleration control of the host vehicle M and terminates the automatic driving mode. In addition, in a case where an operation with respect to the operation devices does not exist, or operation content is not equal to or greater than the threshold value, the hand-over control unit 134 continues the deceleration control.

In addition, after the process in step S110, the specific situation transition control unit 132 terminates notification by the notification device 82, and terminates the process of this flowchart. In addition, in the example of FIG. 10, the process (steps S106 and S114) relating to the notification by the notification device 82 may not be performed.

[Deceleration Control Initiation Process]

Figure 11:
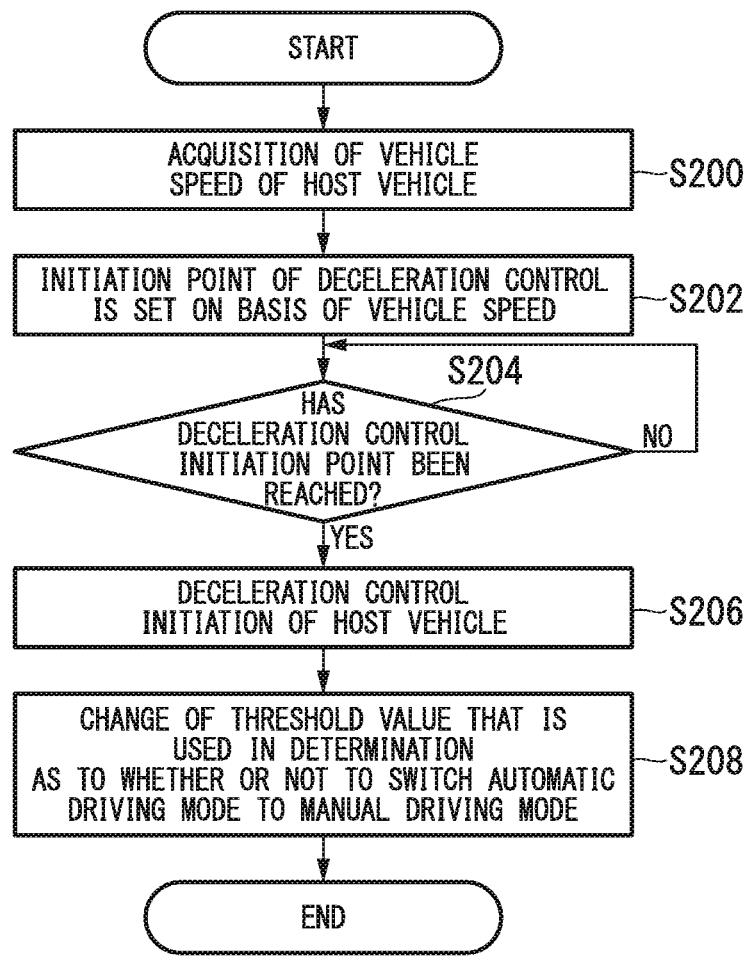
FIG. 11 is a flowchart illustrating an example of a deceleration control initiation process.

FIG. 11 is a flowchart illustrating an example of a deceleration control initiation process. The example of FIG. 11 corresponds to the process in step S104. In the example of FIG. 11, the specific situation transition control unit 132 acquires a vehicle speed of the host vehicle M (step S200), and sets a deceleration control initiation point on the basis of the vehicle speed that is acquired (step S202). Next, the specific situation transition control unit 132 waits until the host vehicle M reaches the deceleration control initiation point (step S204), and initiates the deceleration control of the host vehicle at a point of time at which the host vehicle has reached the deceleration control initiation point (step S206). Next, the hand-over control unit 134 changes a threshold value that is used in determination as to whether or not to switch the automatic driving mode to the manual driving mode in correspondence with operation contents to the operation devices (S208).

According to the vehicle control device 100, the vehicle control method, and the vehicle control program according to the above-described embodiment, in a case of terminating the automatic driving mode, the host vehicle M is decelerated, and thus it is possible to encourage the vehicle occupant of the host vehicle M to perform hand-over. Accordingly, it is possible to realize smooth transition from the automatic driving mode to the manual driving mode. In addition, in this embodiment, a point at which transition from the transition completion point automatic driving mode to the manual driving mode is terminated is provided before the scheduled termination point of the automatic driving mode, and thus it is possible to terminate switching to the manual driving mode (terminate the automatic driving mode) before the host vehicle M reaches the scheduled termination point of the automatic driving mode. As a result, it is possible to improve vehicle control reliability. In addition, in this embodiment, during the deceleration control in transition of the driving modes, a threshold value that is used in determination of switching of the driving modes is changed to a condition that is lower than a threshold value in the related art, and thus it is possible to easily transition to the manual driving mode.

Hereinbefore, an aspect for carrying out the invention has been described with reference to the embodiment, but the invention is not limited to the embodiment, and various modification and substitutions can be made in a range not departing from the gist of the invention.

INDUSTRIAL APPLICABILITY

The invention can be used in an automobile manufacturing industry.

REFERENCE SIGNS LIST

20 Finder
30 Radar
40 Camera
50 Navigation device
60 Vehicle sensor
70 Accelerator pedal
71 Accelerator opening sensor
72 Brake pedal
73 Brake stepping amount sensor
74 Steering wheel
75 Steering angle sensor
80 Change-over switch
82 Notification device
90 Travel drive force output device
92 Steering device
94 Brake device
100 Vehicle control device
110 Automatic driving control unit
112 Host vehicle position recognition unit
114 External field recognition unit
116 Action plan generation unit
118 Trajectory generation unit
120 Travel control unit
130 Switching control unit
132 Specific situation transition control unit
134 Hand-over control unit
140 Storage unit
M Host vehicle

What is claim is:
1. A vehicle control device, comprising:
an automatic driving control unit that executes a first driving mode in which at least one of acceleration/deceleration, and steering of a host vehicle is automatically controlled in order for the host vehicle to travel along a route up to a destination; and
a specific situation transition control unit that encourages a vehicle occupant of the host vehicle to transition to a second driving mode in which the degree of automatic driving is lower in comparison to the first driving mode by decelerating the host vehicle in a case of terminating execution of the first driving mode at a scheduled termination point of the first driving mode, wherein the specific situation transition control unit sets a transition completion point to a point before the scheduled termination point of the automatic driving to make a vehicle speed of the host vehicle be close to zero at the transition completion point.

2. The vehicle control device according to claim 1, wherein the specific situation transition control unit sets a transition completion point to a point before the scheduled termination point of the automatic driving to make a vehicle speed of the host vehicle be zero at the transition completion point.

3. The vehicle control device according to claim 1, wherein in a case of performing deceleration control to transition the host vehicle from the first driving mode to the second driving mode, the specific situation transition control unit sets at least one between a point at which the deceleration control is initiated and deceleration per unit time in correspondence with a current vehicle speed of the host vehicle.

4. The vehicle control device according to claim 1, further comprising:
an output unit that outputs information,
wherein in a case of terminating execution of the first driving mode at the scheduled termination point of the first driving mode, the specific situation transition control unit causes the output unit to output information that encourages the vehicle occupant of the host vehicle to transition to the second driving mode.

5. The vehicle control device according to claim 1, wherein in a case of performing deceleration control to transition the host vehicle from the first driving mode to the second driving mode, the specific situation transition control unit causes a braking force output device that outputs a braking force to output a braking force that intermittently increases or decreases.

6. A vehicle control device, comprising:
an automatic driving control unit that executes a first driving mode in which at least one of acceleration/deceleration, and steering of a host vehicle is automatically controlled in order for the host vehicle to travel along a route up to a destination;
a specific situation transition control unit that encourages a vehicle occupant of the host vehicle to transition to a second driving mode in which the degree of automatic driving is lower in comparison to the first driving mode by decelerating the host vehicle in a case of terminating execution of the first driving mode at a scheduled termination point of the first driving mode; and
a hand-over control unit that switches the first driving mode to the second driving mode on the basis of operation content received by an operation device that is operated by the vehicle occupant,
wherein in a case where control of decelerating the host vehicle is performed by the specific situation transition control unit, the hand-over control unit sets a threshold value that is used in determination as to whether or not to switch the first driving mode to the second driving mode to a threshold value with which switching from the first driving mode to the second driving mode is easier in comparison to a threshold value in a case where the control of decelerating the host vehicle is not performed by the specific situation transition control unit.

7. A vehicle control device, comprising:
an automatic driving control unit that executes a first driving mode in which at least one of acceleration/deceleration, and steering of a host vehicle is automatically controlled in order for the host vehicle to travel along a route up to a destination; and
a specific situation transition control unit that encourages a vehicle occupant of the host vehicle to transition to a second driving mode in which the degree of automatic driving is lower in comparison to the first driving mode by decelerating the host vehicle in a case of terminating execution of the first driving mode at a scheduled termination point of the first driving mode;
wherein in a case of performing deceleration control to transition the host vehicle from the first driving mode to the second driving mode, the specific situation transition control unit causes a braking force output device that outputs a braking force to output a braking force that is different in the degree of deceleration between a first half and a second half of a period of transitioning the first driving mode to the second driving mode.

8. The vehicle control device according to claim 7, wherein the specific situation transition control unit causes the braking force output device that outputs the braking force to output a braking force that reduces a speed in such a manner that a curve of a vehicle speed with the passage of time becomes upwardly convex up to a predetermined timing in a period of transitioning the first driving mode to the second driving mode, and the curve of the vehicle speed with the passage of time becomes downwardly convex after the predetermined timing.

* * * * *